(12) United States Patent
Singh et al.

(10) Patent No.: US 8,082,406 B1
(45) Date of Patent: Dec. 20, 2011

(54) TECHNIQUES FOR REDUCING DATA STORAGE NEEDS USING CDP/R

(75) Inventors: Abhay Kumar Singh, Sunnyvale, CA (US); Raghu Krishnamurthy, Santa Clara, CA (US); Gopal Sharma, San Jose, CA (US); Deepak Tawri, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 502 days.

(21) Appl. No.: 11/862,932

(22) Filed: Sep. 27, 2007

(51) Int. Cl.
*G06F 13/00* (2006.01)
*G06F 13/28* (2006.01)

(52) U.S. Cl. .. 711/162; 711/161; 711/165; 711/E12.016

(58) Field of Classification Search .................. None
See application file for complete search history.

(56) References Cited

U.S. PATENT DOCUMENTS

| | | | | |
|---|---|---|---|---|
| 7,827,366 B1 * | 11/2010 | Nadathur et al. | ............. | 711/162 |
| 2004/0123031 A1 * | 6/2004 | Kiselev et al. | ................ | 711/114 |
| 2006/0174074 A1 * | 8/2006 | Banikazemi et al. | ......... | 711/162 |
| 2007/0234356 A1 * | 10/2007 | Martins et al. | ................... | 718/1 |
| 2008/0013365 A1 * | 1/2008 | Yueh | ............................ | 365/149 |
| 2008/0091744 A1 * | 4/2008 | Shitomi et al. | ................ | 707/204 |

OTHER PUBLICATIONS

Taneja Group Technology Analysts; Product Profile: *EMC RecoverPoint (formerly Kashya) Data Protection Appliance*; Sep. 2006; 9 pages.

Symantec White Paper: Enterprise Solutions; *Veritas™ Volume Replicator Option by Symantec A Guide To Understanding Volume Replicator*, www.symantec.com; Sep. 2006; 28 pages.

* cited by examiner

*Primary Examiner* — Reginald Bragdon
*Assistant Examiner* — Eric S Cardwell
(74) *Attorney, Agent, or Firm* — Wilmer Cutler Pickering Hale and Dorr LLP

(57) ABSTRACT

Techniques for reducing data storage needs using continuous data protection and replication are disclosed. In one particular exemplary embodiment, the techniques may be realized as a method for reducing data storage needs using a continuous data protection and replication device comprising creating a master image of material identified by a user, generating a virtual replica of the master image on a storage area network using the continuous data protection and replication device to virtualize physical storage containing the master image, generating a copy of the virtual replica on the storage area network, and providing a virtual logical unit number to access the copy, wherein the access enables a process which requires exclusive access to content of the master image to obtain such access without requiring physical storage for an entire copy of the master image.

19 Claims, 3 Drawing Sheets

TECHNIQUES FOR REDUCING DATA STORAGE NEEDS USING CDP/R

FIELD OF THE DISCLOSURE

The present disclosure relates generally to data storage and replication, and, more particularly, to techniques for reducing data storage needs using continuous data protection and replication (CDP/R).

BACKGROUND OF THE DISCLOSURE

Server virtualization is an increasingly popular technology enabling the running of multiple virtual machines on a single physical machine. This may reduce the number of physical machines required for data centers, server farms, and other environments serving multiple users. Unfortunately, although the number of physical machines may be reduced resulting in some server consolidation, these virtual machines and virtual environments still require access to files which may not be shared and thus must be repetitively duplicated. Specifically, many virtualized machines or environments require exclusive access to boot files, operating system files, application files, license files or other files. A single physical machine, for example, may host ten virtual machines. These virtual machines may require their own copies or images of an operating system even though all ten virtual machines and the physical machine hosting them may be running identical operating systems. If an operating system image requires, for example, four gigabytes of storage, the machine will be required to store or have forty gigabytes of storage for operating system images for the virtual machines alone and another 4 gigabytes for the physical machine itself. This storage requirement is quickly compounded by multiplying the requirement by the number of physical machines in a datacenter hosting virtual machines or virtual environments. The storage requirement is particularly significant in light of the fact that many or perhaps all of these operating system images are identical, yet the requirement of exclusive access to each image by a virtual machine, physical machine or a virtual environment prevents sharing of an image.

In view of the foregoing, it may be understood that there are significant problems and shortcomings associated with current methods of storing data which is common to multiple environments or machines or platforms.

SUMMARY OF THE DISCLOSURE

Techniques for reducing data storage needs using continuous data protection and replication are disclosed. In one particular exemplary embodiment, the techniques may be realized as a method for reducing data storage needs using a continuous data protection and replication device comprising creating a master image of material identified by a user, generating a virtual replica of the master image on a storage area network using the continuous data protection and replication device to virtualize physical storage containing the master image, generating a copy of the virtual replica on the storage area network, and providing a virtual logical unit number to access the copy, wherein the access enables a process which requires exclusive access to content of the master image to obtain such access without requiring physical storage for an entire copy of the master image.

In accordance with other aspects of this particular exemplary embodiment, the techniques may be realized as an article of manufacture for reducing data storage needs using a continuous data protection and replication device, the article of manufacture comprising at least one processor readable medium and instructions carried on the at least one medium, wherein the instructions are configured to be readable from the at least one medium by at least one processor and thereby cause the at least one processor to operate so as to create a master image, generate a virtual replica of the master image on a storage area network using the continuous data protection and replication device to virtualize physical storage containing the master image, generate a copy of the virtual replica on the storage area network, and provide a virtual logical unit number to access the copy, wherein the access enables a process which requires exclusive access to content of the master image to obtain such access without requiring physical storage for an entire copy of the master image.

In accordance with further aspects of this particular exemplary embodiment, the techniques may be realized as a system for reducing data storage needs using a continuous data protection and replication device comprising one or more processors operatively connected to the continuous data protection and replication device, wherein the continuous data protection and replication device is associated with a storage area network, and the continuous data protection and replication device is configured to create a master image of material identified by a user, generate a virtual replica of the master image on the storage area network using the continuous data protection and replication device to virtualize physical storage containing the master image, generate a copy of the virtual replica on the storage area network, and provide a virtual logical unit number to access the copy, wherein the access enables a process which requires exclusive access to content of the master image to obtain such access without requiring physical storage for an entire copy of the master image.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
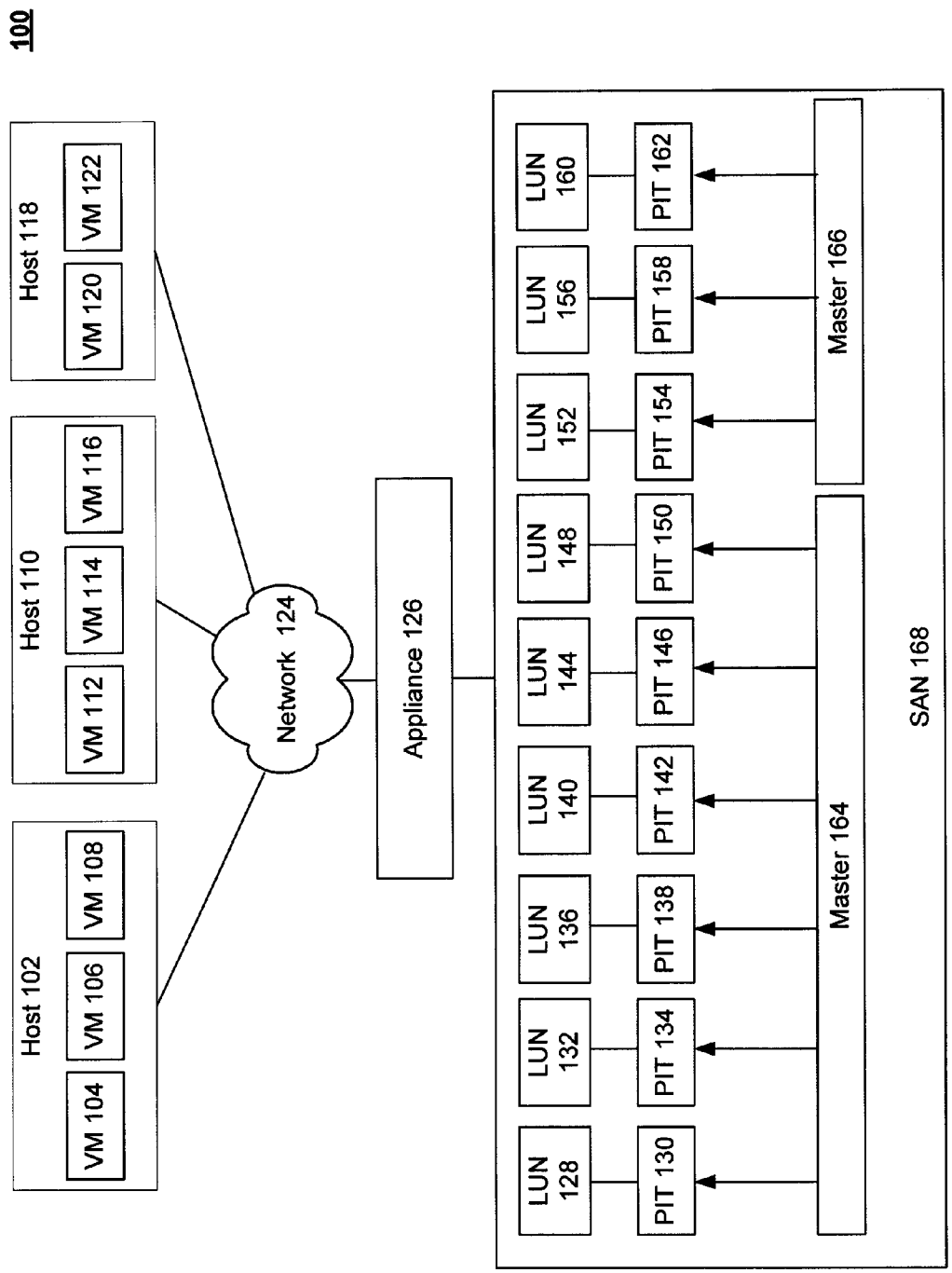
FIG. 1 shows a system for reducing data storage needs utilizing continuous data protection and replication in accordance with an embodiment of the present disclosure.

Referring to FIG. 1, there is shown a system 100 for reducing data storage needs utilizing continuous data protection and replication in accordance with an embodiment of the present disclosure. Hosts 102, 110 and 118 may represent application hosts utilizing continuous data protection and replication (CDP/R) services. Host 102 may contain virtual machines VM 104, VM 106 and VM 108. Host 110 may contain virtual machines VM 112, VM 114 and VM 116. Host 118 may contain virtual machines VM 120 and VM 122. In one or more embodiments VM 104-VM 122 may represent virtual machines, platform virtualization, operating system level virtualization, application virtualization or other resource virtualization. Hosts 102, 110 and 118 may be operatively connected to Network 124.

Network 124 may be a local area network (LAN), a wide area network (WAN), the Internet, cellular networks, satellite networks or other networks that permit communication between Hosts 102, 110 and 118 and other devices operatively connected to Network 124, such as appliance 126. Appliance 126 may be a continuous data protection and replication (CDP/R) device which may provide continuous data protection and replication (CDP/R) services to hosts 102, 110 and 118. CDP/R services may be provided through the use of a network switch or may be provided through a continuous data protection and replication appliance. In one or more embodiments, appliance 126 may represent a network switch providing CDP/R services to hosts 102, 110 and 118. Appliance 126 may by operatively connected to storage area network (SAN) 168.

In one or more embodiments, SAN 168 may represent a storage area network (SAN), an Internet small computer systems interface (iSCSI) SAN, a Fiber Channel SAN, a common Internet File System (CIFS) or a network file system (NFS).

SAN 168 may contain one or more master image files such as master 164 and master 166. Appliance 126 may generate one or more virtual replicas of one or more devices, virtual devices or portions of devices containing master 164 and master 166. Once virtual replicas are generated for one or more portions of devices, appliance 126 may make the virtual replica accessible through one or more virtual logical unit numbers (LUNS) on the SAN. Appliance 126 may create one or more point in time (PIT) images of one or more virtual replicas.

Point in time (PIT) images 130, 134, 138, 142, 146 and 150 may represent point in time images of master 164. PIT 130, 134, 138, 142, 146, 150, 154, 158 and 162 may also represent virtual point in time images, space optimized point in time images or other storage virtualization structures available through the use of continuous data protection and replication services. Point in time images may allow a process or device which requires exclusive access to the content of a master image such as master 164 or master 166. Point in time images may appear to be separate files or images from a master file upon which they are based but may in fact require no additional storage other than the storage required for the original master file. Point in time images may be writable, and one or more changes made to a point in time image may be stored in storage associated with the point in time image. A point in time image may allow one or more processes to thus obtain exclusive access to the content of a master image using no additional storage beyond the storage previously allocated for the master image. Changes to the point in time image may be made by a device or process utilizing the image and they may be written to storage associated with the point in time image and may store the changes without affecting the master image upon which the point in time image is based. This may allow a device or process utilizing the point in time image to write changes specific to a virtual device or virtual environment. Appliance 126 may make point in time images accessible through the creation of virtual LUNS exposed on SAN 168.

LUNS 128, 132, 136, 140, 144 and 148 may be virtual LUNS providing access to point in time (PIT) images 130, 134, 138, 142, 146 and 150, respectively. Point in time images (PIT) 154, 158 and 162 may represent point in time images of master 166. LUNs 152, 156 and 160 may be virtual LUNs and may provide access on SAN 168 to PITs 154, 158 and 162, respectively.

Figure 2:
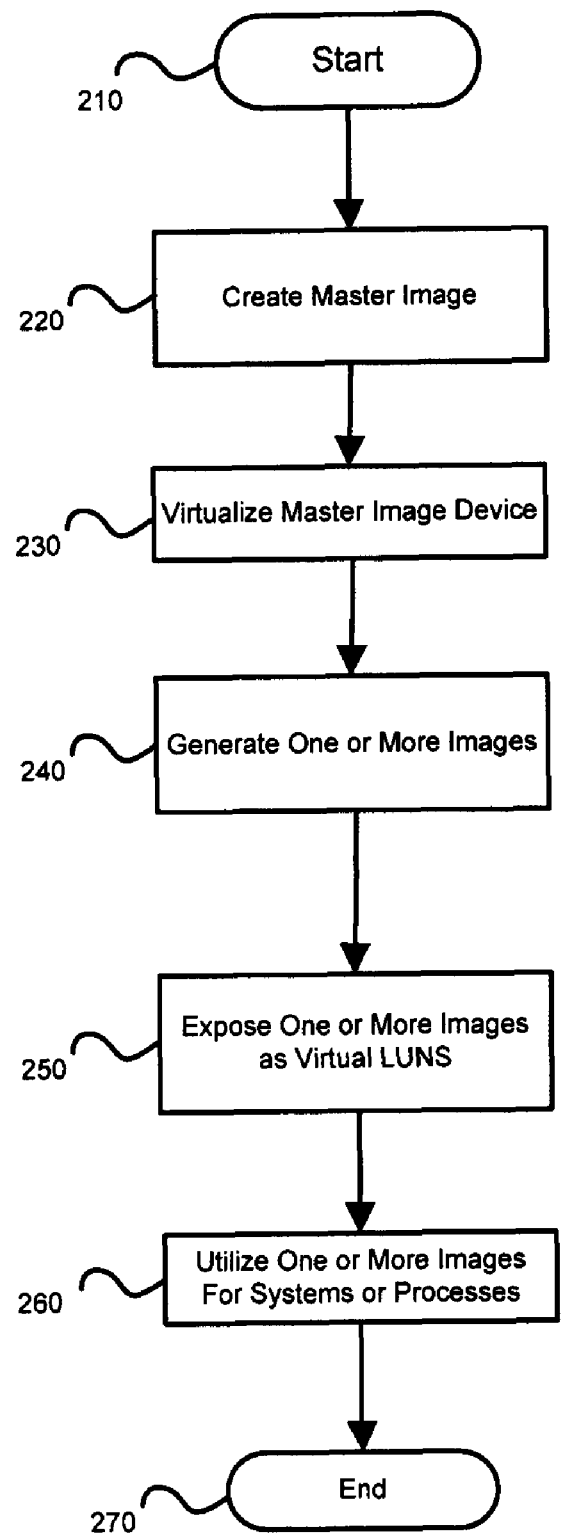
FIG. 2 shows a method for reducing data storage needs utilizing continuous data protection and replication in accordance with an embodiment of the present disclosure.

Referring to FIG. 2, there is shown a method 200 for reducing data storage needs utilizing continuous data protection and replication in accordance with an embodiment of the present disclosure. The method may start at block 210. At block 220, a user of the method may create a master image. The master image may contain a boot disk image, an application stack, operating system files, license files or other files or data which a user may desire to make available to a virtual machine or a virtual environment. In some embodiments, the master image may represent a gold image, a base image or other reference which may determine a starting reference for software version control. The master image may thus be used to determine a baseline or standard when creating multiple environments including physical and virtual client and server environments. Multiple master images may be utilized to support different environments. By way of non-limiting example, a data center may utilize a master image to provide a baseline for one or more Linux server environments, and the data center may utilize the same image for virtual Linux server environments or actual physical server environments. In another example, a data center may utilize a master image to represent an application stack baseline such as a UNIX operating system installation, a database management system and an application residing on top of the UNIX/database platform. The data center may create multiple master images which may represent different stages or different clients. For example, a data center may create a master image for an application stack that is currently in production. The data center may make additional master images which may represent different versions of the same application stack in a development, in testing or in other phases of a software development lifecycle. The method may continue at block 230.

At block 230, one or more master images may be virtualized. In one or more embodiments, virtualization may be accomplished by requesting that a disk, partition, virtual disk or other portion of storage be protected utilizing continuous data protection and replication. For example, a user may request that a disk containing master 164 be added to continuous data protection and replication service coverage provided by appliance 126. Master 164 may contain a UNIX operating system boot image, a Microsoft Windows™ boot image, or another boot image to be provided to virtual machines residing on Host 102. In some embodiments, master 164 may contain a license file, an file providing identification or authorization or another file to which an operating system process or an application needs exclusive access. Once a disk is added to continuous data protection and replication (CDP/R) service coverage, an appliance, such as appliance 126, providing CDP/R services may create a virtual replica of the disk on one or more SANs. The virtual replica of the disk may contain the content of the replicated master but may not require additional storage on the SAN. Once a virtual replica is created for a master, an appliance may create a virtual LUN on the SAN which may provide access to the virtual replica. The method may continue at block 240.

At block 240, one or more images of the virtual replica may be generated. These one or more images may be point in time (PIT) images which may be generated by a CDP/R appliance.

For example, appliance 126 may be a CDP/R appliance and may generate point in time images PIT 130, 134, 138, 142, 146 and 150 from a virtual replica of master 164. At block 250, one or more of the images may be exposed as virtual LUNS on one or more SANs. For example, appliance 126 may generate virtual LUNS 128, 132, 136, 140, 144 and 148 on SAN 168, which may correspond to PIT images 130, 134, 138, 142, 146 and 150. Virtual replicas, point in time images and virtual LUNs may not require any additional storage space on a SAN to support directory tree entries. All or a portion of the overhead infrastructure requirements for virtual replicas, point in time images, or virtual LUNs may be provided by an appliance, such as a CDP/R appliance. Thus, making an image of a master file available utilizing an existing CDP/R appliance associated with a SAN may not require additional storage on the SAN. The method may continue at block 260.

At block 260, one or more of the point in time images may be utilized by a system or process requiring access to the content of a master image. As a non-limiting example, host 102 may require an operating system boot image which may be contained in master 166. Master 166 may be accessible to Host 102 via LUN 152 which may be a virtual LUN which exposes point in time image 154. Point in time image 154 may be writable and may enable host 102 to write environment specific data without altering the content of master 166. For example, host 102 may write a server name, network address information, user account information or other device or environment specific information to point in time image 154. Device or environment specific settings or other data written to a point in time image may require storage which may be provided on a SAN associated with the point in time image. Writing to a point in time image may require storage only for the difference in the data between the image and the master image. To continue the example, while host 102 may access PIT 154 via LUN 154, hosts 110 and 118 may access the same operating system boot image through different point in time images. Hosts 110 and 118 may access LUNs 156 and 160, respectively. Environment specific data, device specific data or other data written by host 110 may be written to point in time image PIT 158. PITs 154, 158 and 162 may enable hosts 102, 110 and 118 to obtain exclusive access to the content of master 166. This may avoid any locking or contention issues without requiring duplication of or additional storage for copies of master 166. Additionally hosts 102, 110 and 118 may contain multiple virtual machines which may require access to a boot image or other data contained in master 164. These virtual machines, virtual environments or processes may be provided access through LUNs 128, 132, 136, 140, 144 and 148, which may expose corresponding writable point in time (PIT) images.

Figure 3:
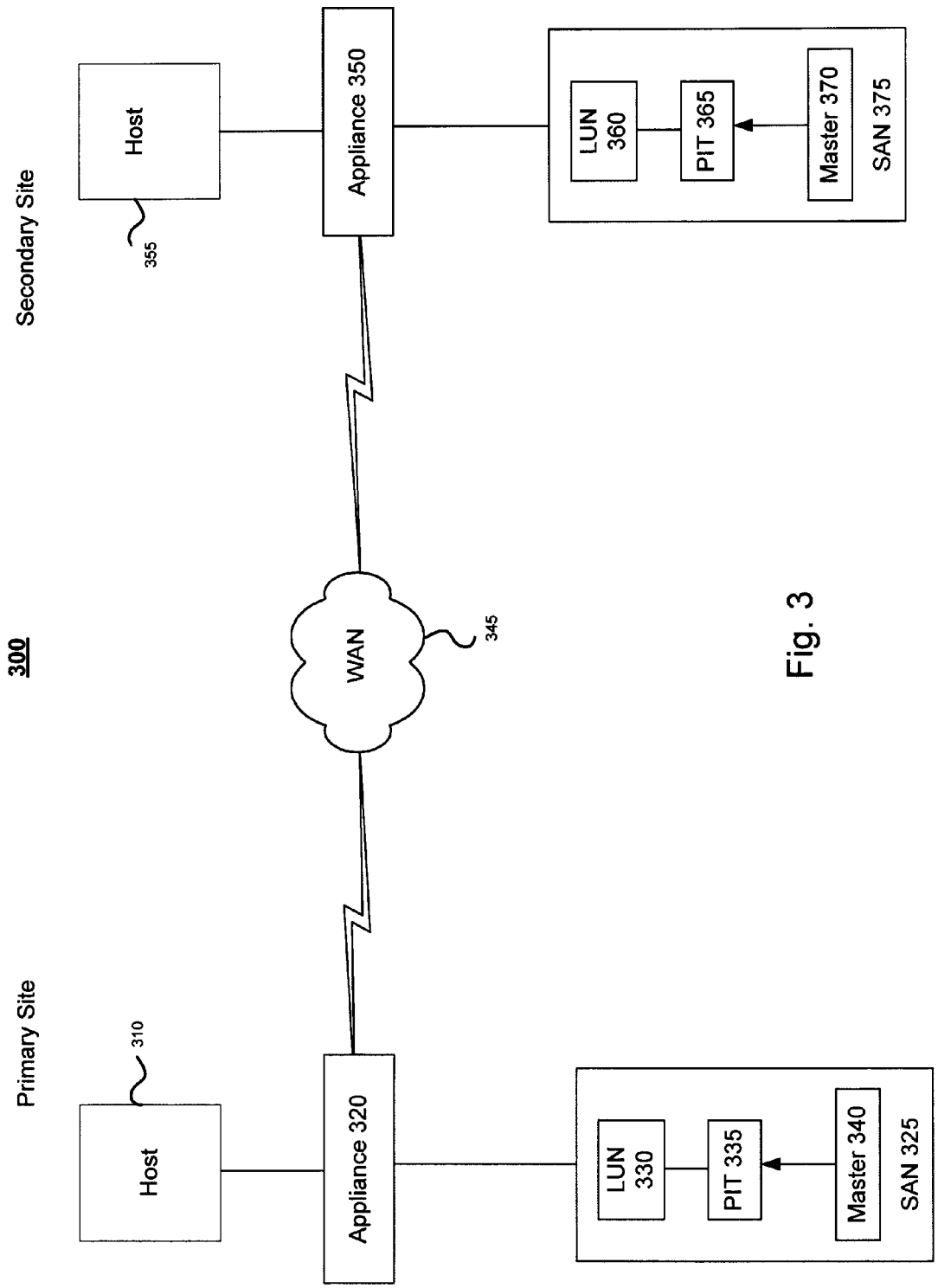
FIG. 3 shows a system for reducing data storage needs utilizing continuous data protection and replication in accordance with an embodiment of the present disclosure.

Referring to FIG. 3, there is shown a system 300 for reducing data storage needs utilizing continuous data protection and replication in accordance with an embodiment of the present disclosure. Host 310 may represent a host at a primary site utilizing continuous data protection and replication (CDP/R) services of appliance 320. Appliance 320 may be operatively connected to storage area network (SAN) 325. SAN 325 may contain a master image 340 which may reside on a disk, device or virtual disk receiving continuous data protection from appliance 320. Appliance 320 may create a point in time image PIT 335 which may be made available on SAN 325 through virtual LUN 330. Host 310 may utilize PIT 335 as a boot image, an application stack or for other purposes. Host 310 may contain one or more virtual machines utilizing different point in time images of master 340. Additional hosts may also access SAN 325 and one or more point in time images.

In the case of an outage of SAN 325, multiple hosts, clients, virtual hosts and other devices may be disrupted if access to the content of SAN 325 is not available. Appliance 320 may be operatively connected to wide area network (WAN) 345. WAN 345 may be operatively connected to one or more secondary sites. A secondary site may contain appliance 350 which may be a continuous data protection and replication appliance. Appliance 350 may receive data from appliance 320 and may ensure that SAN 375 remains synchronized with SAN 325. Host 355 may be present at the secondary site and may provide a host in the event of the failure of one or more components of the primary site. Host 355 may access SAN 375 through appliance 350. SAN 375 may contain a master 370 which may represent a master boot image whose content may be utilized by one or more hosts, virtual machines, clients, virtual environments or processes at the secondary site. The content of master 370 may be virtualized and one more point in time images, such as PIT 365, may be made of master 370. PIT 365 may be exposed via virtual LUN 360.

In the event of failure of one or more components of a primary site, the replication and synchronization of appliances 320 and 350 may enable a secondary site to accommodate one or more hosts, virtual machines, clients, servers or processes utilizing replicated boot images and other data files and reducing data storage needs for those images and data files.

In one or more embodiments, it may be possible to update or modify a master file. In such embodiments it may be possible to propagate updates or modifications to one or more point in time images. For example, a user may patch, update, upgrade, or otherwise modify a boot image master file. The user may then utilize a CDP/R appliance to control the replication to one or more point in time images. This may enable a user to update a master file with a critical patch and propagate the patch to one or more of the point in time images of that master file. For example, a user, by patching a master file once, may be able to patch all or a subset of the clients, servers, virtual servers, virtual environments and processes that utilize point in time images of the master file. This may be accomplished with no more disruption to the clients, servers, virtual servers, virtual environments and processes than would occur if a physical boot image of a physical host were patched directly. A user may patch a master file and may control the propagation time of the changes, such as ensuring that a patch that required rebooting of an environment was propagated overnight or over a weekend. Control of multiple environments with common file dependencies may be therefore simplified while data storage requirements may be reduced.

In some embodiments, it may be possible to use point in time images to alter the version of the master file that a server, client, virtual machine, virtual environment or process is utilizing. For example, it may be possible to use CDP/R services of appliance 126 to change a master file or a virtual replica to refer to an earlier version of the master file. This may enable a user of CDP/R services to effectively roll back a boot image for one or more servers, clients, virtual servers, virtual environments or other processes to an earlier version. A user may desire to do this, for example, if they want to restore one or more servers, virtual servers or other users of a master file to a version before a patch or an upgrade. It may enable a user to recover from a unsuccessful or undesirable change to a master boot image or other change to a master file.

A further benefit of consolidating multiple repetitive copies into a virtualized master file with one or more point in time images, may be the reduction of processes that are necessary to maintain those copies as well as the reduction of overhead associated with those processes. For example, a virus scanning process or program may be configured to only scan a master file and one or more changed portions of point in time images of the master file. This may enable one or more hosts, virtual machines, virtual environments, clients and/or processes using writable point in time images to scan only changed portions of a point in time image and avoid the wasted repetitive effort of multiple processes scanning identical point in time image content across one or more clients, servers or environments. Additionally, processing time may be greatly reduced for one or more processes scanning multiple clients, servers, virtual servers, or virtual environments to ensure that they contain a latest version of software, a patched version of software, a baseline of deployed applications or other verification or updating processes.

At this point it should be noted that reducing data storage needs utilizing a continuous data protection and replication appliance in accordance with the present disclosure as described above typically involves the processing of input data and the generation of output data to some extent. This input data processing and output data generation may be implemented in hardware or software. For example, specific electronic components may be employed in a continuous data protection and replication appliance or similar or related circuitry for implementing the functions associated with the creation of point in time images, virtual LUNS and virtual replicas in accordance with the present disclosure as described above. Alternatively, one or more processors operating in accordance with stored instructions may implement the functions associated with continuous data protection and replication in accordance with the present disclosure as described above. If such is the case, it is within the scope of the present disclosure that such instructions may be stored on one or more processor readable carrier (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for reducing data storage needs using a continuous data protection and replication device comprising:
    creating a master image of material identified by a user;
    generating a virtual replica of the master image on a storage area network using the continuous data protection and replication device to virtualize physical storage containing the master image;
    generating a plurality of writable point in time images of the virtual replica on the storage area network, wherein writes to each of the writable point in time images contain data indicating one or more differences between each of the writable point in time images and the master image, wherein the write data is stored in storage associated with each of the writable point in time images, and wherein the each of the writable point in time images require no storage for data of the master image;
    providing a virtual logical unit number to access each of the writable point in time images and to permit exclusive access to the data of the master image for a process which requires exclusive access to the data of the master image;
    writing one or more updates to the master image; and
    utilizing the continuous data protection and replication device to selectively apply the one or more updates to a subset of the writable point in time images.

2. The method of claim 1, wherein the master image represents a boot image.

3. The method of claim 1, wherein the continuous data protection and replication device is one of:
    a continuous data protection and replication appliance and a network switch providing continuous data protection and replication services.

4. The method of claim 1, wherein at least one writable point in time image is used as a boot image for a computer.

5. The method of claim 1, wherein at least one writable point in time image is used as a boot image for a virtual machine.

6. The method of claim 1, wherein the one or more updates to the master image comprise updates to a boot image which include at least one of: a patch, an update, an upgrade, removing one or more portions of a boot image, and adding boot image software.

7. The method of claim 6, wherein the one or more updates to the boot image may enable one or more actions for a computer utilizing the boot image including: upgrading one or more portions of the boot image, updating one or more portions of the boot image, patching one or more portions of the boot image, adding additional software to the boot image, and removing one or more software portions of the boot image.

8. The method of claim 6, wherein the one or more updates to the boot image may enable one or more actions for a computer utilizing the boot image including: upgrading one or more portions of the boot image, updating one or more portions of the boot image, patching one or more portions of the boot image, adding additional software to the boot image, and removing one or more software portions of the boot image.

9. The method of claim 1, further comprising replicating the master image to one or more secondary sites.

10. The method of claim 9, whereby the one or more secondary sites provide the ability to boot one or more servers in the event of a failure of a primary site.

11. The method of claim 9, whereby the one or more secondary sites provide the ability to boot one or more virtual machines in the event of a failure of a primary site.

12. At least one processor readable medium for storing a computer program of instructions configured to be readable by at least one processor for instructing the at least one processor to execute a computer process for performing the method as recited in claim 1.

13. The method of claim 1, wherein the continuous data protection and replication device utilizes at least one writable point in time image to alter the master image.

14. An article of manufacture for reducing data storage needs using a continuous data protection and replication device, the article of manufacture comprising:
- at least one non-transitory processor readable storage medium; and
- instructions carried on the at least one medium;
- wherein the instructions are configured to be readable from the at least one medium by at least one processor and thereby cause the at least one processor to operate so as to: create a master image;
- generate a virtual replica of the master image on a storage area network using the continuous data protection and replication device to virtualize physical storage containing the master image;
- generate a plurality of writable point in time images of the virtual replica on the storage area network, wherein writes to each of the writable point in time images contain data indicating one or more differences between each of the writable point in time images and the master image, wherein the write data is stored in storage associated with each of the writable point in time images, and wherein each of the writable point in time images requires no storage for data of the master image; and
- provide a virtual logical unit number to access each of the writable point in time images and to permit exclusive access to the data of the master image for a process which requires exclusive access to the data of the master image;
- write one or more updates to the master image; and
- utilize the continuous data protection and replication device to selectively apply the one or more updates to a subset of the writable point in time images.

15. A system for reducing data storage needs using a continuous data protection and replication device comprising:
- one or more processors operatively connected to the continuous data protection and replication device, wherein the continuous data protection and replication device is associated with a storage area network; and
- the continuous data protection and replication device configured to:
  - create a master image of material identified by a user;
  - generate a virtual replica of the master image on the storage area network using the continuous data protection and replication device to virtualize physical storage containing the master image;
  - generate a plurality of writable point in time image of the virtual replica on the storage area network, wherein writes to each of the writable point in time images contain data indicating one or more differences between each of the writable point in time images and the master image, wherein the write data is stored in storage associated with each of the writable point in time images, and wherein each of the writable point in time images requires no storage for data of the master image;
  - provide a virtual logical unit number to access the writable point in time image and to permit exclusive access to the data of the master image for a process which requires exclusive access to the data of the master;
  - write one or more updates to the master image; and
  - selectively apply the one or more updates to a subset of the writable point in time images.

16. The system of claim 15, wherein the continuous data protection and replication device is at least one of:
- network switch providing continuous data protection and replication services and a continuous data protection and replication appliance.

17. The system of claim 15, wherein the continuous data protection and replication device is further configured to:
- restore a master image to a previous point in time image; and
- update each of the writable point in time image to reflect the previous point in time image.

18. The system of claim 15, further comprising a virus scanner wherein the virus scanner is configured to scan a master image and one or more changes to one or more copies of the master image.

19. The system of claim 15, wherein the continuous data protection and replication device utilizes at least one writable point in time image to alter the master image.

* * * * *